(12) United States Patent
Sturgin

(10) Patent No.: US 8,365,892 B2
(45) Date of Patent: Feb. 5, 2013

(54) RATCHETING ONE-WAY CLUTCH

(75) Inventor: Todd J. Sturgin, Shreve, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 563 days.

(21) Appl. No.: 12/608,260

(22) Filed: Oct. 29, 2009

(65) Prior Publication Data

US 2010/0116614 A1     May 13, 2010

Related U.S. Application Data

(60) Provisional application No. 61/198,743, filed on Nov. 7, 2008.

(51) Int. Cl.
*F16H 45/02* (2006.01)
(52) U.S. Cl. ............................. 192/46; 60/345
(58) Field of Classification Search ............. 192/46; 60/345
See application file for complete search history.

(56) References Cited

U.S. PATENT DOCUMENTS

| 8,051,959 | B2* | 11/2011 | Eisengruber | 188/82.3 |
| 2004/0159517 | A1* | 8/2004 | Thomas | 192/39 |
| 2007/0045076 | A1 | 3/2007 | Brees et al. | |
| 2010/0181157 | A1* | 7/2010 | Smetana | 192/46 |

FOREIGN PATENT DOCUMENTS

DE    102007029812    *   1/2009

* cited by examiner

*Primary Examiner* — David D Le
*Assistant Examiner* — Stacey Fluhart
(74) *Attorney, Agent, or Firm* — Simpson & Simpson, PLLC

(57) ABSTRACT

The present invention is a ratcheting one-way clutch for an automotive component such as, for example, a stator for a torque converter. A plurality of ramp plates is provided that are positioned on either side of the catch plate. Each ramp plate includes a series of locking fingers directed at an angle toward the catch plate in a plane that enables the fingers to engage with one of the at least one windows on the catch plate. Such an engagement prevents the catch plate from rotating in the engagement direction, while the angled orientation of the locking fingers allows the catch plate to rotate freely in the opposite (freewheeling) direction. Biasing elements are proved to axially bias the ramp plates toward the centrally positioned catch plate.

8 Claims, 8 Drawing Sheets

US 8,365,892 B2

RATCHETING ONE-WAY CLUTCH

CROSS-REFERENCE TO RELATED APPLICATIONS

This application claims the benefit under 35 U.S.C. §119 (e) of U.S. Provisional Application No. 61/198,743 on Nov. 7, 2008 which application is incorporated herein by reference.

FIELD OF THE INVENTION

The invention relates to the field of unidirectional or one-way clutches. More specifically, it relates to the one-way clutches for use in automobiles and more specifically, a clutch design that may be used to reduce lash and vibration noise in automotive components.

BACKGROUND OF THE INVENTION

Lash is the condition in which small spaces lie between the splines of a toothed or geared connection, such as a splined clutch and stator shaft or between planetary gears of an automatic transmission. The gaps in a spline connection are necessary to allow the two structures to be connected during assembly. Similarly, in the case of a sliding or rotating connections, lash exists as the "sliding space" is necessary in order for the connection to function. However, in each case, the spaces or gaps causing the two connected structures to collide with each other when the connection occurs causing an impact that can often be heard when there is a change in inertia or relative motion between the two structures such as when there is a change in torque converter turbine speed.

What is needed then are structures that reduce the space or distance between connection splines or fingers of toothed, geared or similar connections.

SUMMARY OF THE INVENTION

The present invention broadly comprises a one-way or unidirectional clutch for an automotive component that includes a catch plate having a first side and a second side and defining at least one window with the catch plate operatively attached to the automotive component; a pair of outer clutch plates with each of the outer clutch plates having at least one outer biasing element on one side of the outer clutch plate and at least one outer locking finger on the other side of the outer clutch plate facing the catch plate with one of the pair of outer clutch (or ramp) plates on either side of the catch plate. The invention also includes a pair of inner clutch (or ramp) plates that each include at least one inner biasing element on one side of the inner clutch plate and at least one inner locking finger on the other side of the inner ramp plate with the at least one inner locking finger facing the catch plate, and a plurality of slots to receive one of the at least one outer locking fingers, and a pair of biasing surfaces, each of the pair of biasing surfaces contacting at least one of the at least one biasing elements on each of the pair of outer clutch plates. A first one of the pair of inner clutch plates is positioned between the first side of the catch plate and the first outer clutch plate and a second one of the pair of inner clutch plates is positioned between the second outer clutch plate and the second side of the catch plate. The biasing elements act to axially displace each of the pair of outer clutch plates and each of the pair of inner clutch plates. In a preferred embodiment, the at least one inner biasing elements contact one of the pair of biasing surfaces.

One object of the present invention is to provide a one-way clutch for use with a stator of a torque converter.

A second object of the invention is to reduce the lash or vibration noise generated when a clutch is engaged.

A third object of the invention is to supply a one-way clutch that may be fabricated from stamped parts.

These and other objects, features, and advantages of the present invention will be readily appreciable from the following description of the various embodiments of the invention and from the accompanying drawings and claims.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF PREFERRED EMBODIMENTS OF THE INVENTION

At the outset, it should be appreciated that like drawing numbers on different drawing views identify identical structural elements of the invention. It also should be appreciated that figure orientations, proportions, and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
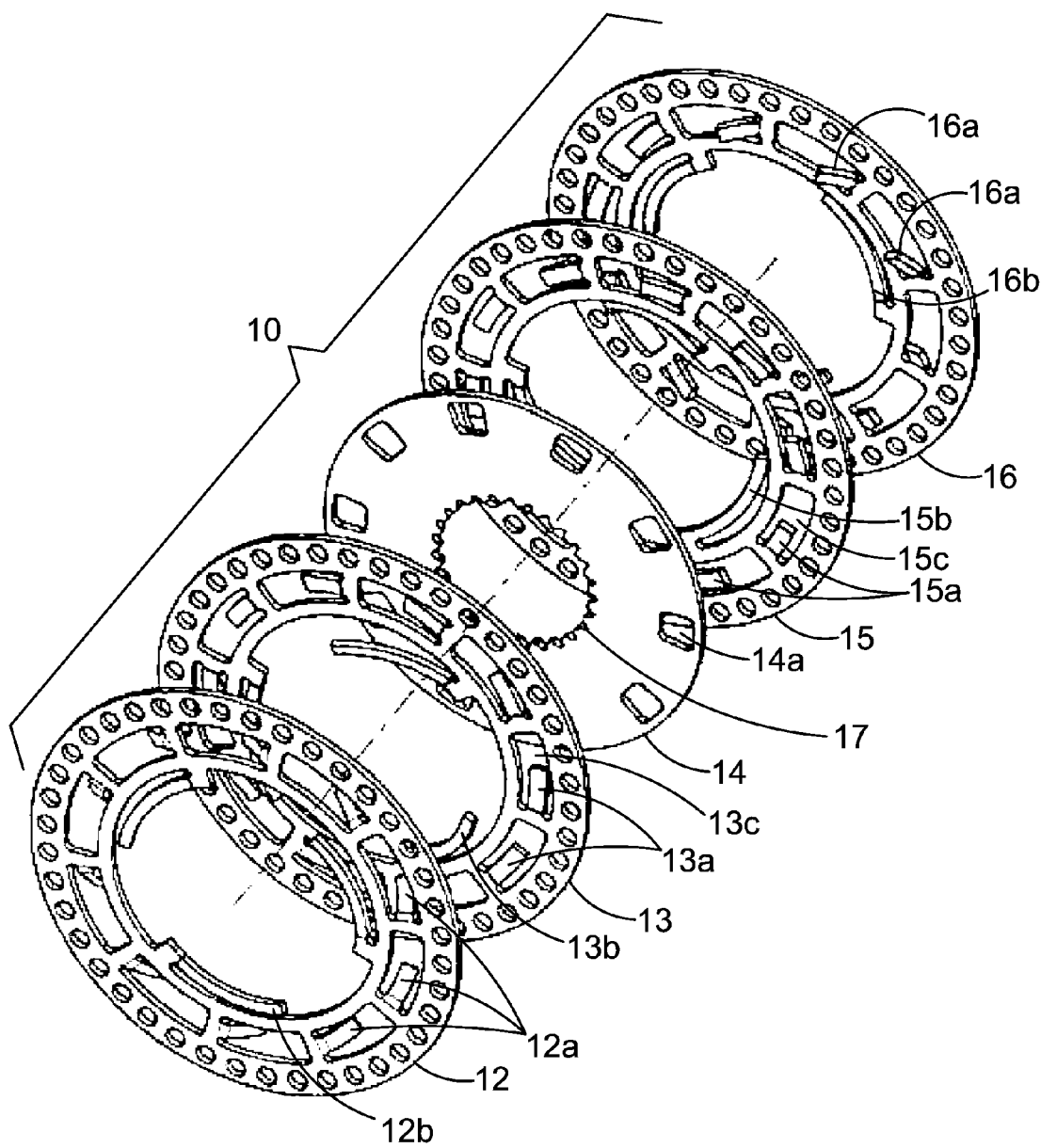
FIG. 1 is an exploded top perspective view of the ratcheting one-way clutch of the present invention.

Adverting to the drawings, FIG. 1 is an exploded top perspective view of the ratcheting one-way clutch 10 of the present invention. First and second inner ramp plates 13 and 15, respectively, are placed on either side of catch plate 14. Outer ramp plates 12 and 16, respectively, are positioned on the outer sides of inner ramp plates 13 and 15 respectively. Catch plate 14 includes windows 14a and a splined inner edge 17. The splines of inner edge 17 may be used to fit into splines of an automotive component such as shaft (not shown). As explained below, windows 14a are aligned to receive one of the plurality of locking fingers 12a, 13a, 15a, and 16a.

Figure 2:
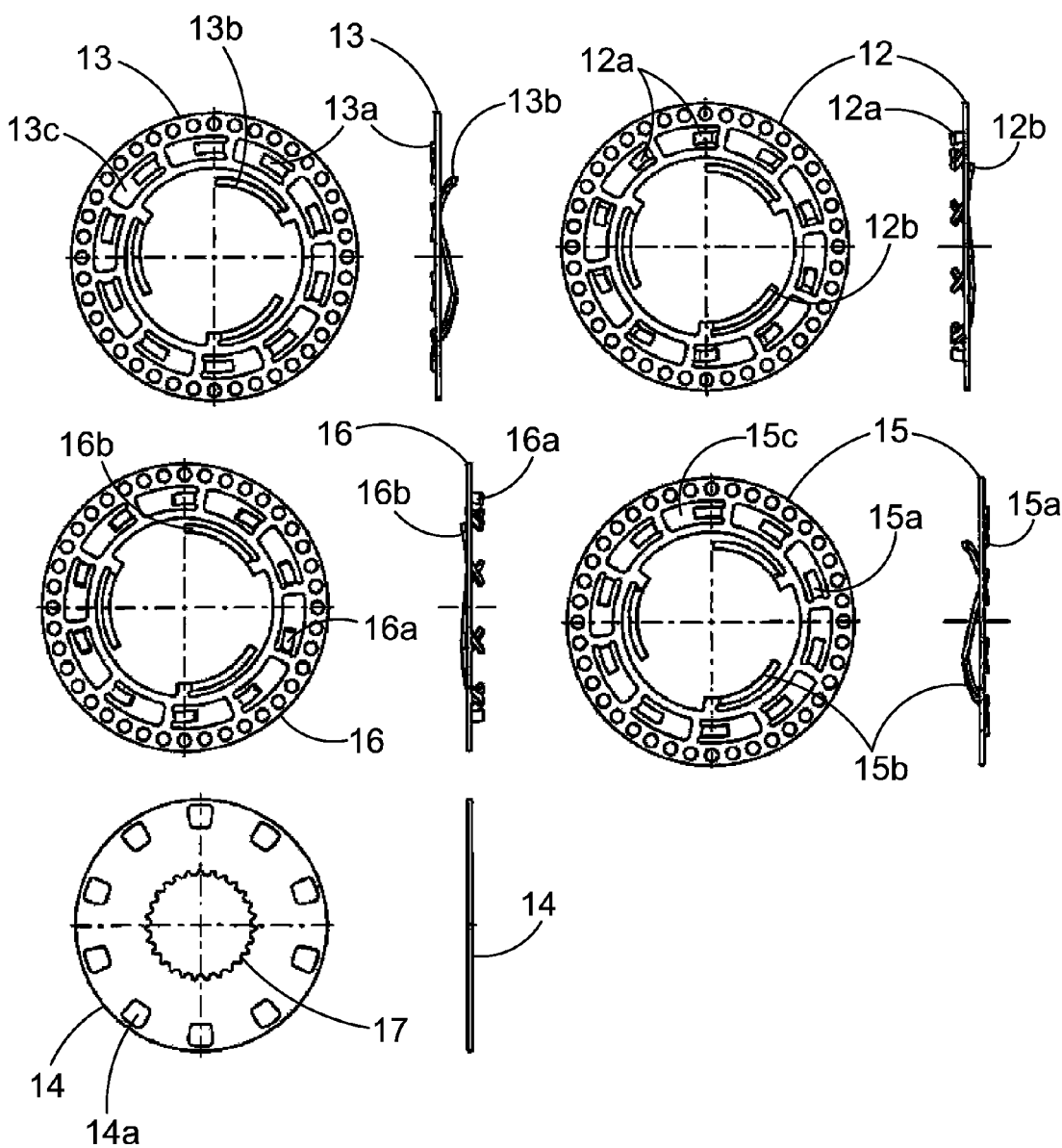
FIG. 2 depicts each of the ramp plates of the clutch of the present invention in both a top plan view and a side view.

FIG. 2 depicts each of plates 12-16 of clutch 10 in both a top plan view and a side or edge view. This drawing arrangement shows the locking fingers of each ramp plate extending from one side of the particular ramp plate and a biasing element, such as a biasing spring, extending from the opposite side of the ramp plate. The top view of first outer ramp plate 12 ("ramp plate 12") shows a plurality of locking fingers 12a distributed around plate 12 as well as biasing elements 12b. The accompanying side or edge view of ramp plate 12 shows at least one biasing element 12b and locking fingers 12a extending from the opposite sides of ramp plate 12. Similar arrangements are seen for inner ramp plate 13, inner ramp plate 15, and outer ramp plate 16. The locking fingers 12a, 13a, 15a, and 16a extend from the inner side (toward the centrally positioned catch plate 14) while the biasing elements extend from the outer side of each respective ramp plate.

As will be explained in detail below, the plurality of locking fingers from each ramp plate are oriented at an angle and are aligned to engage window 14a of catch plate 14 to allow clutch plates 12, 13, 15, and 16 to rotate in only one direction. As noted above, catch plate 14 preferably includes a splined inner edge 17 that is operatively attached to a shaft, such as a stator shaft. As an example, clutch 10 may be used as a one-way clutch for a stator for a torque converter. Both types of components are well known to those having skill in the art. By operatively attached is meant that a component or device is connected either directly or indirectly to a second component and causes that second component to operate in a prescribed manner. For example, as described above, clutch 10 is described as operatively attached to a stator meaning clutch 10 will prevent a torque converter stator from rotating in one-direction enabling the stator to direct fluid to a torque converter pump in a prescribed direction.

Figure 3:
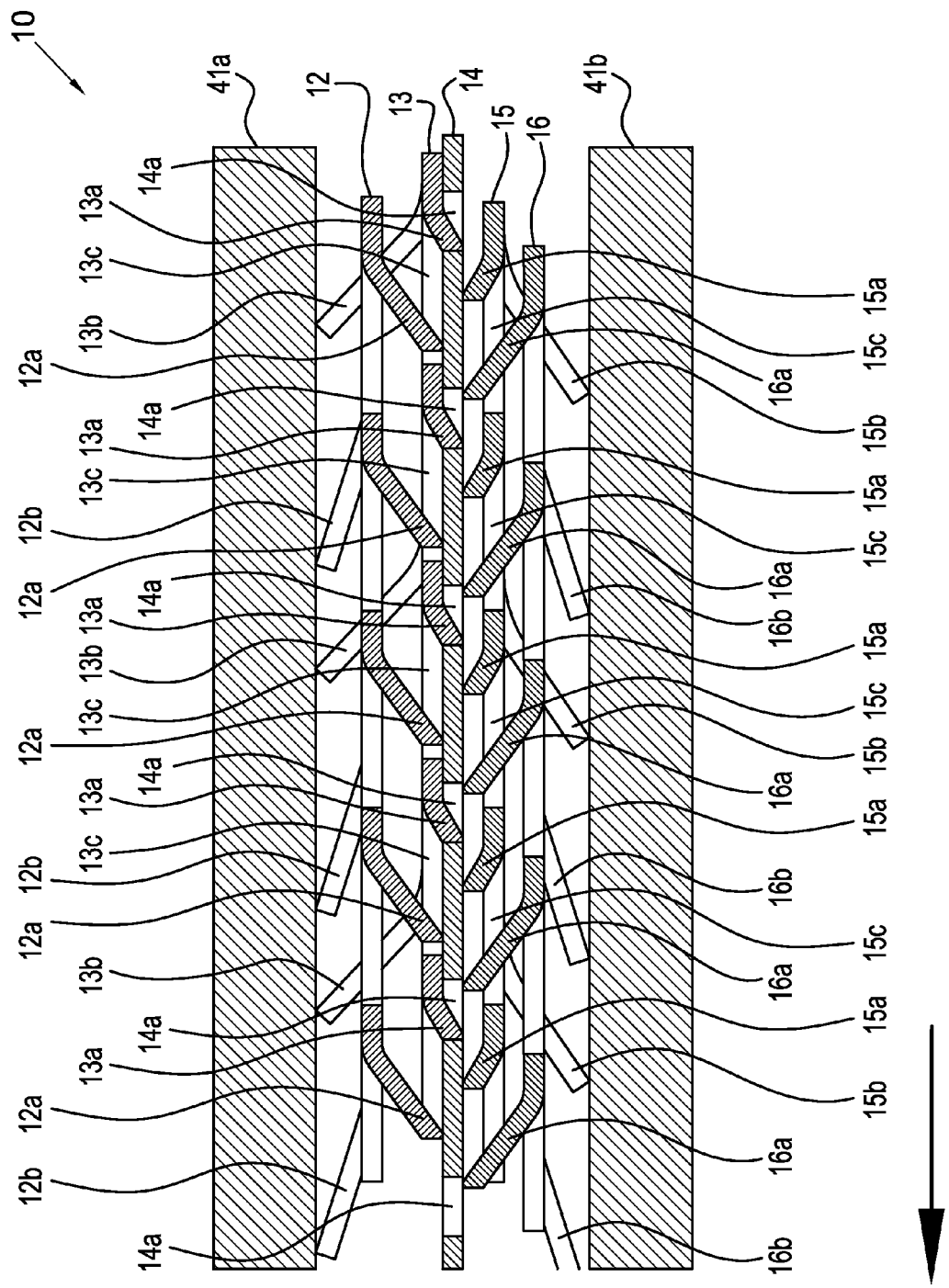
FIG. 3 is a schematic cross section showing the position of the locking fingers of the first inner ramp plate contacting the windows of the centrally positioned catch plate of the one-way clutch of the present invention.

FIGS. 3-8 are a series of schematic cross section views of the ramp plates 12, 13, 15, and 16 in operative attachment to catch plate 14. Specifically, FIGS. 3-8 are schematic cross sections showing the position of the individual sets of locking fingers on each of ramp plates 12, 13, 15, and 16. FIG. 3 depicts the engagement of locking fingers 13a of inner ramp plate 13 engaged with windows 14a of catch plate 14. The arrow shows the direction ramp plate 13 moves so that locking fingers 13a engage windows 14a of catch plate 14. Each of locking fingers 13a is shown in contact with an edge of window 14a. This contact prevents clutch plate 13 from continuing to rotate in the direction of the arrow shown in the FIG. 3 as inner ramp plate 13 is engaged with window 14a and is thus prevented from rotating in the direction of the arrow.

Figure 4:
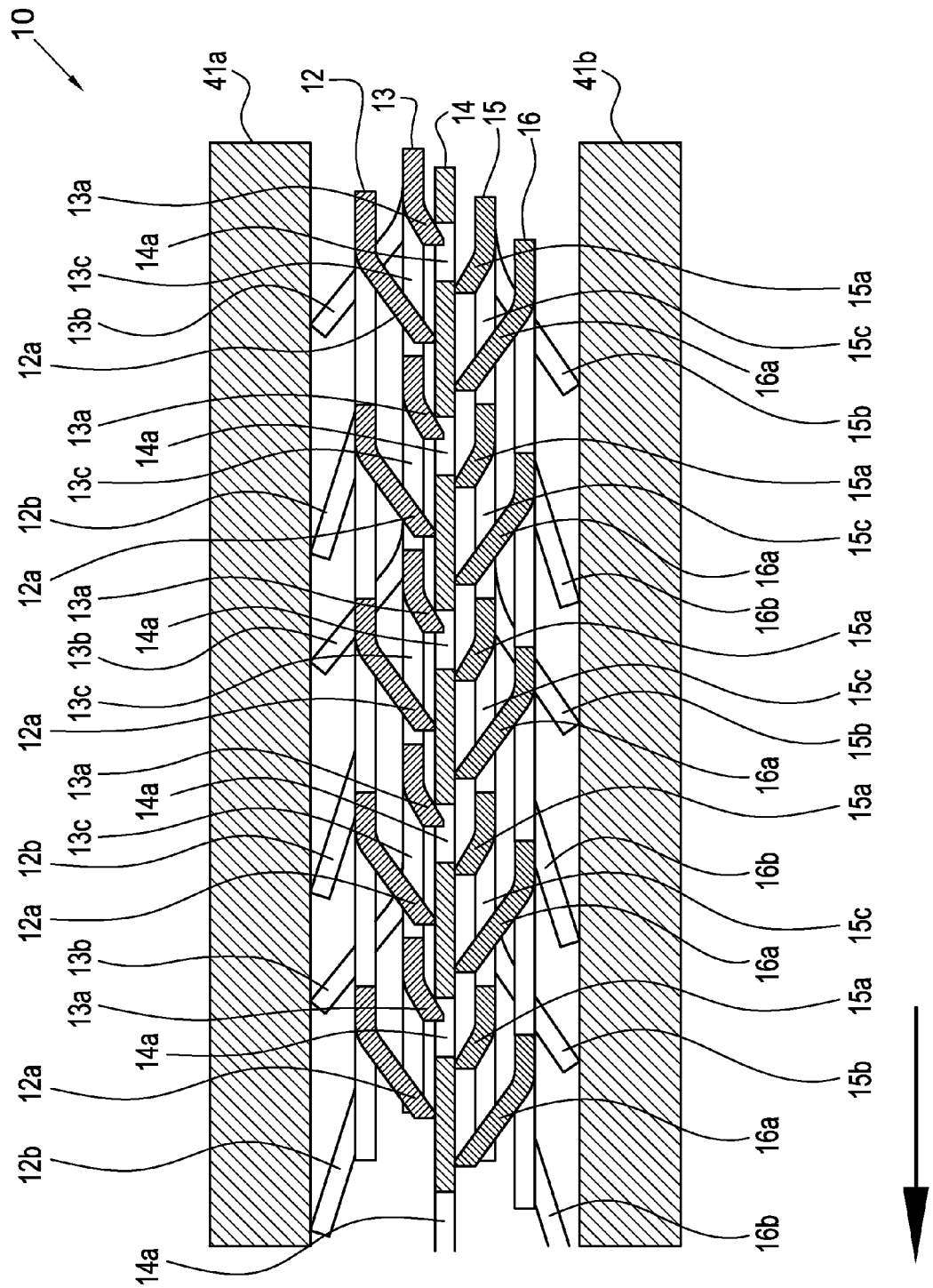
FIG. 4 is a schematic cross section view of the one-way clutch in which the interlocking fingers of the first inner ramp plate are disengaged from the windows defined by the catch plate.

FIG. 4 is a schematic cross section view of clutch 10 in which fingers 13a are disengaged from windows 14a on catch plate 14. It should be noted that this disengagement can be seen if ramp plate 13 is rotating in the direction opposite to the arrow (the freewheeling or unlocking direction). In this direction, catch plate 14 will fail to engage any of the fingers of any of the rotating clutch plates 12, 13, 15, and 16. As seen in FIG. 4, the locking fingers all project in the same direction. If clutch plates 12, 13, 15, and 16 rotate in the opposite direction as the locking fingers project, the fingers will not engage windows 14a, but will rather slide over the windows 14a and the surface between each window 14a. This in effect causes clutch 10 act as a one-way clutch on catch plate 14 as it prevents ramp plates 12, 13, 15, and 16 from rotating in one direction, while allowing them to rotate in the opposite direction. It should be noted that all of the locking fingers from all of the ramp plates are disengaged from catch plate 14.

Figure 5:
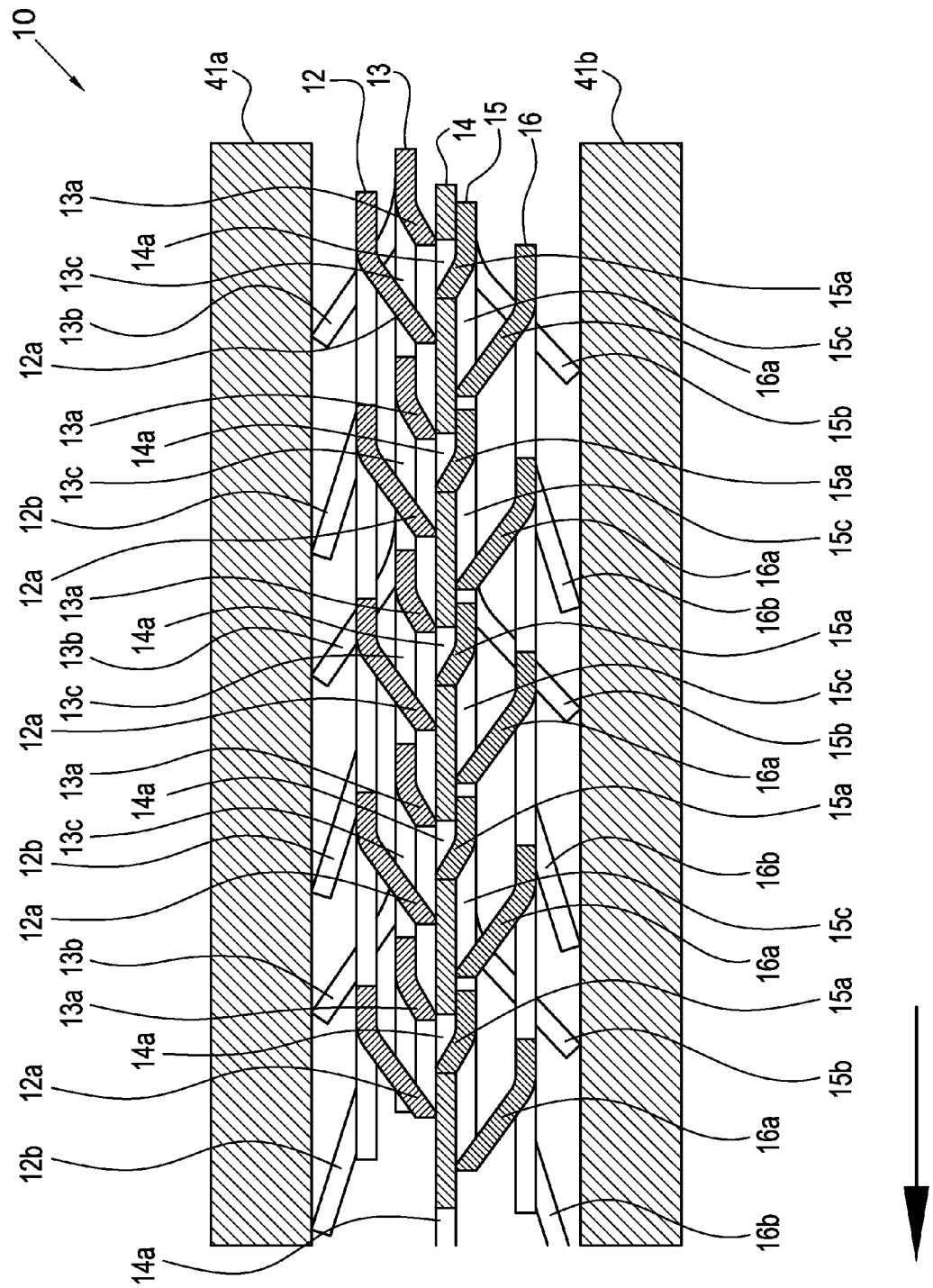
FIG. 5 is a schematic cross section view of the one-way clutch in which some or all of the plurality of locking fingers of the second inner ramp plate are engaged with the edge of one of the windows of the catch plate.
Figure 6:
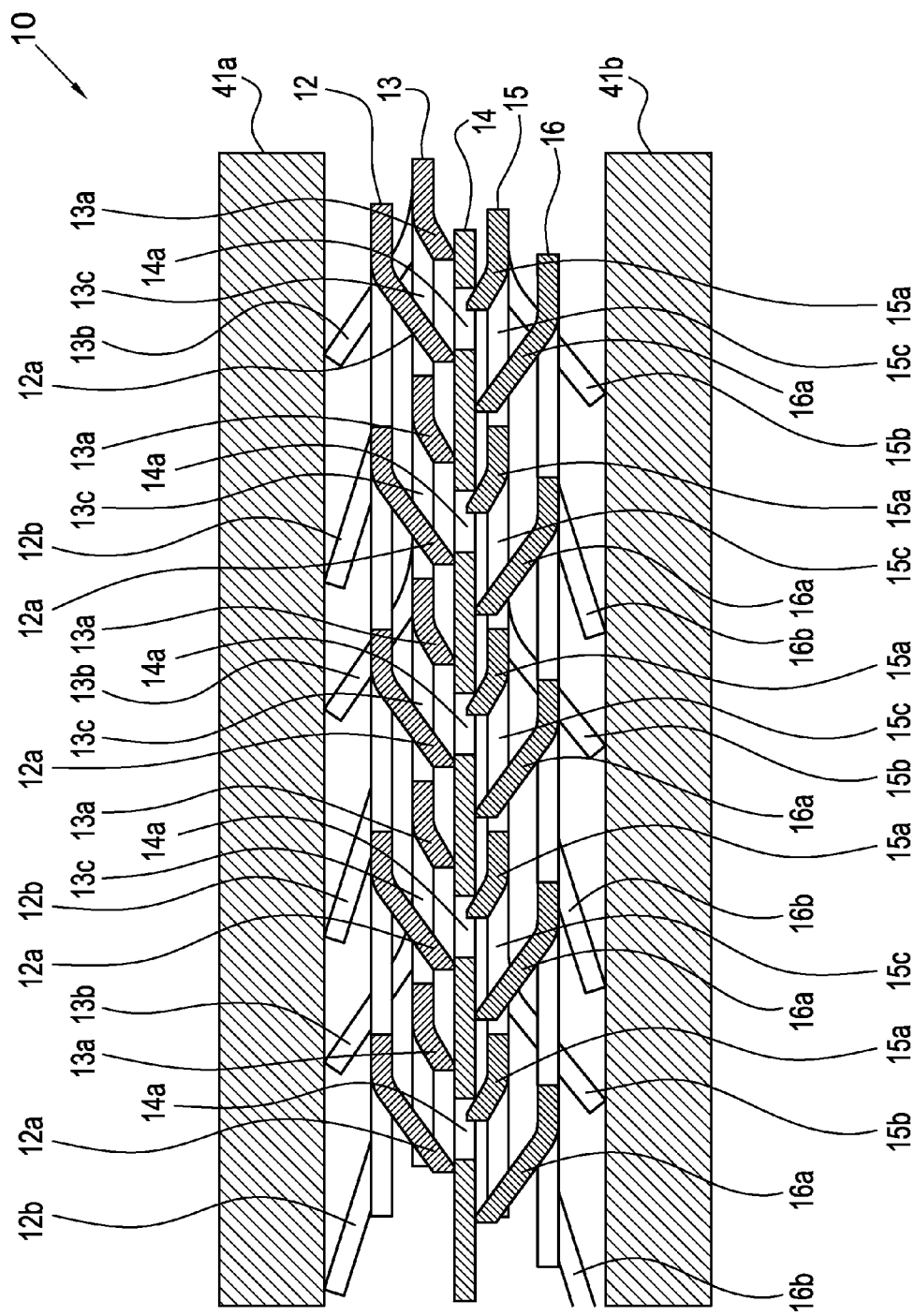
FIG. 6 shows the interlocking fingers of the second inner ramp plate disengaged from the windows of the catch plate similar to the disengagement of interlocking fingers seen in FIG. 4.

FIG. 5 is a schematic cross section view of clutch 10 in which some or all of the plurality of locking fingers 15a of second inner ramp plate 15 are each engaged with the edge of one of windows 14a of catch plate 14. As with fingers 13a, fingers 15a prevent clutch plate 15 from rotating in the direction of the arrow. It will be seen that fingers 13a as well as the fingers 12a and 16a of outer ramp plates 12 and 16, respectively, are all disengaged from any of windows 14a and are either contacting or positioned over the surface of catch plate 14 between windows 14a or extend into window 14a but do not contact an edge of window 14a. FIG. 6 shows the interlocking fingers 15a disengaged from windows 14a similar to the disengagement of fingers 13a seen in FIG. 4.

Figure 7:
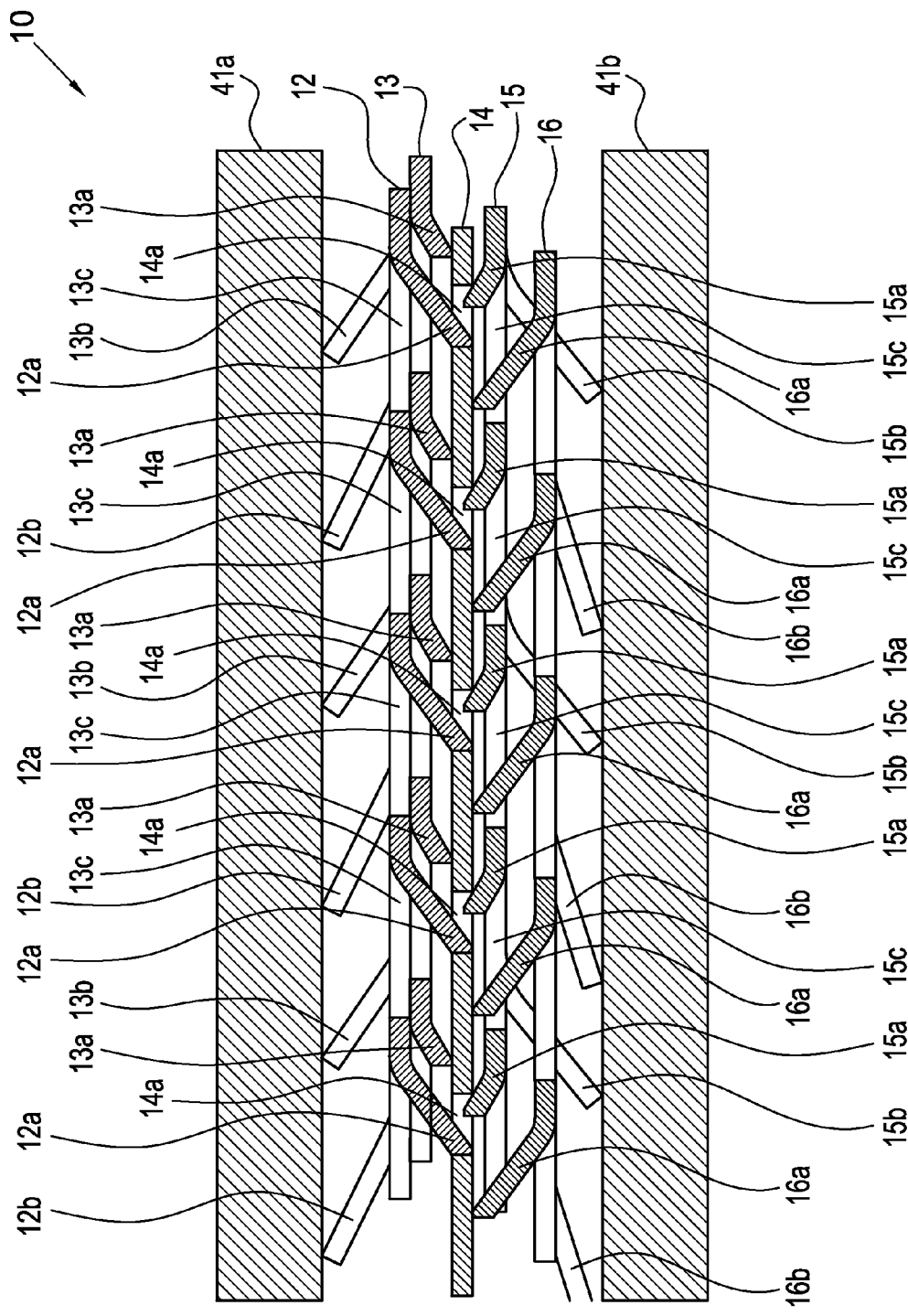
FIG. 7 is a schematic cross section view of the one-way clutch in which some or all of the plurality of locking fingers of the first outer ramp plate are each engaged with the edge of one of windows of the catch plate; and, FIG. 8 shows the interlocking fingers from the first outer ramp plate disengaged from the windows of the catch plate while still extending through the slots of the adjacent inner ramp plate.
Figure 8:
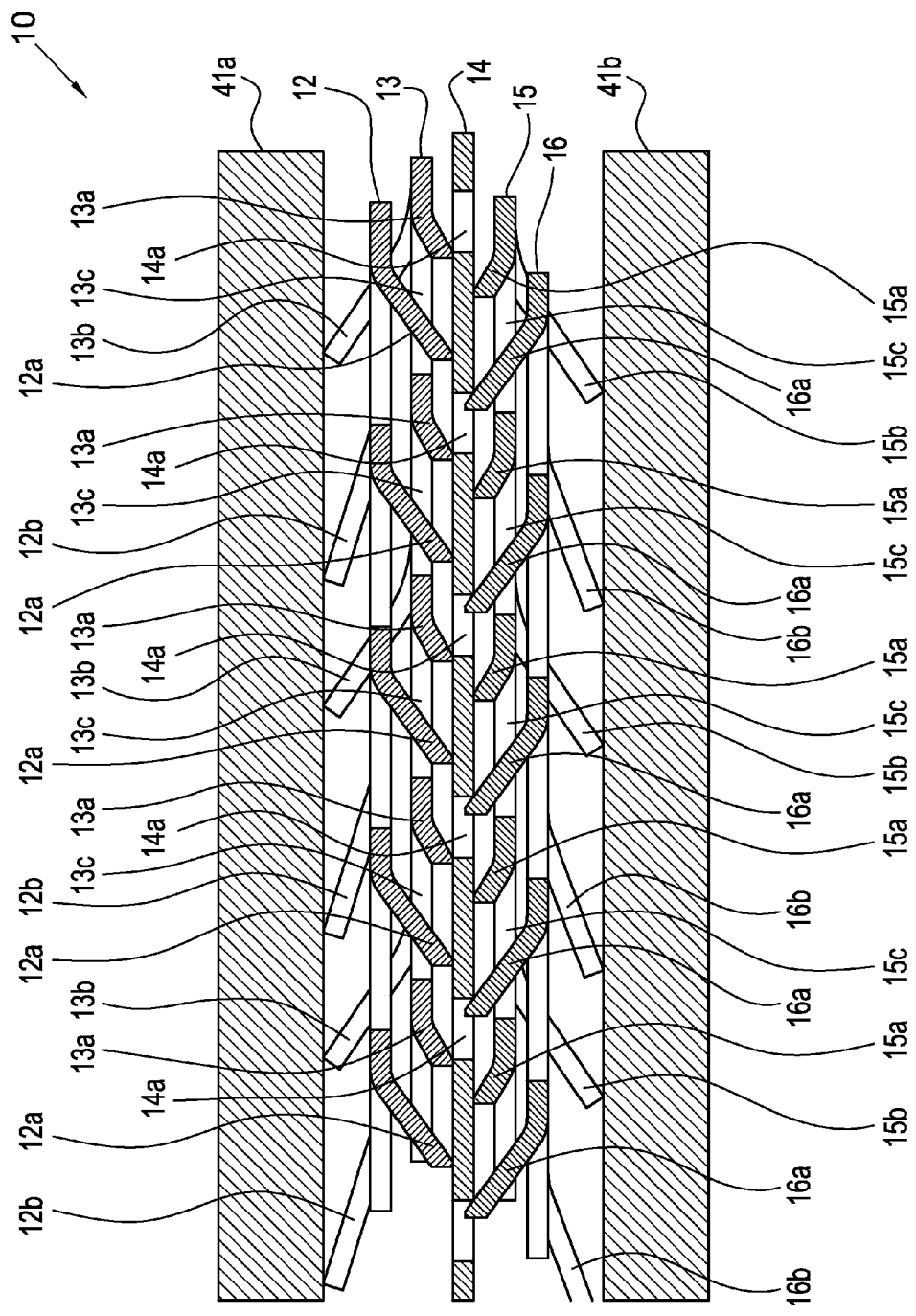

FIG. 7 is a schematic cross section of clutch 10 in which some or all of the plurality of locking fingers 12a of first outer ramp plate 12 are each engaged with the edge of one of windows 14a of catch plate 14. Fingers 12a engage windows 14a similar to the fingers of inner plates 13 and 15. It can be seen that fingers 12a extend through slots 13c in inner plate 13 to reach windows 14a. Thus, outer plate 12 and inner plate 13 are aligned so that fingers 12a of outer plate 12 can extend through slots 13c to reach and engage with windows 14a. FIG. 8 shows the interlocking fingers 12a disengaged from windows 14a while still extending through slots 13c. A similar arrangement can be seen with ramp plates 15 and 16 in which fingers 16a extend through slots 15c of ramp plate 15.

Biasing elements 12b, 13b, 15b, and 16b extend from the opposite sides of ramp plates 12, 13, 15, and 16, respectively and contact biasing surfaces 41a or 41b. Biasing surfaces may be covers positioned on either side of clutch 10, other automotive components, a flange extending from a shaft extending through clutch 10, or other part or piece. Biasing surfaces 41a and 41b may be identical or different components. Biasing elements 12b, 13b, 15b, and 16b may be in the form of springs.

Biasing elements 12b, 13b, 15b, and 16b allow ramp plates 12, 13, 15, and 16 to be axially displaced along the axis extending though clutch 10 seen in FIG. 1. The biasing pressure on each ramp plate is toward catch plate 14. In this way, if the interlocking fingers of a particular ramp plate engage windows 14a, the remaining disengaged fingers will still be forced toward catch plate 14 so that after disengagement of one set of fingers, the same or a different set of fingers from a different ramp plate will be positioned to readily engage windows 14a when ramp plates 12, 13, 15, and 16 start to move in the engagement or lock up direction.

As an example, it can be seen in FIG. 3 that fingers 13a engage windows 14a. If fingers 13a become disengaged, clutch plates 12, 13, 15, and 16 may rotate in the direction of the arrow to engage fingers 16a from second outer plate 16 with windows 14a. Biasing springs 16b act to keep fingers 16a pushed axially toward catch plate 14 to keep fingers 16a in position to engage with windows 14a.

It can also be seen that biasing elements 12b, 13b, 15b, and 16b keep fingers 12a, 13a, 15a, and 16a, respectively, pressed axially into position so that even if clutch plates 12, 13, 15, and 16 rotate in the freewheeling direction, fingers 12a, 13a, 15a, and 16a will be positioned to engage or lock up catch plate 14 once they rotate in the locking direction.

It can be seen from FIGS. 3-8 that the plurality of interlocking fingers extending toward and engaging with the single series of windows 14a together act as a ratchet by allowing movement of ramp plates 12, 13, 15, and 16 in only one rotational direction. In a preferred embodiment, because of the total number of fingers provided by all of ramp plates 12, 13, 15, and 16, there are only small distances between each of the individual fingers of the various ramp plates. As can be seen in FIG. 3, for example, fingers 16a, 12a, and 15a are positioned between a first engaged finger 13a and the next engaged finger 13a in the next succeeding window 14a. Thus, there is only a relatively short distance between any one engaged finger and the next finger in line to engage with a particular window 14a. Because the noise created from a lash condition is caused by the momentum generated by the distance a finger from one of the ramp plates 12, 13, 15, and 16 rotates before engagement with a window 14a from catch plate 14, the shorter travel distances created by the plurality of fingers 12a, 13a, 15a, and 16a reduce the momentum and thus reduce the subsequent noise.

Although the operation of clutch 10 has been described such that clutch plates 12, 13, 15, and 16 rotate in either a lock up or freewheeling direction, it will be recognized by those having skill in the art that clutch 10 may operate such that catch plate 14 rotates in a lock up or freewheeling direction while ramp plates 12, 13, 15, and 16 are stationary in relation to catch plate 14.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A one-way clutch for an automotive component comprising:
    a catch plate having a first side and a second side and defining at least one window, said catch plate operatively attached to said automotive component;
    a pair of outer clutch plates, each of said pair of outer clutch plates including:
        at least one outer biasing element on one side of said outer clutch plate and formed of a single first piece of material forming the outer clutch plate; and,
        at least one outer locking finger on the other side of said outer clutch plate, said at least one outer locking finger extending at an acute angle toward said catch plate;
        wherein a first one of said pair of outer clutch plates is positioned on said first side of said catch plate and a second one of said pair of outer clutch plates is positioned on said second side of said catch plate;
    a pair of inner clutch plates each of said inner clutch plates including:
        at least one inner biasing element on one side of said inner clutch plate and formed of a single second piece of material forming the inner clutch plate;
        at least one inner locking finger on the other side of said inner clutch plate, said at least one locking finger extending at an acute angle toward said catch plate;
        a plurality of slots to receive one of said at least one outer locking finger; and,
    a pair of biasing surfaces, each of said pair of biasing surfaces contacting at least one of said at least one biasing elements on each of said pair of outer clutch plates;
    wherein the at least one outer locking finger is directly engageable with the catch plate;
    wherein a first one of said pair of inner clutch plates is positioned between said first side of said catch plate and said first outer clutch plate and a second one of said pair of inner clutch plates is positioned between said second outer clutch plate and said second side of said catch plate; and,
    wherein said biasing elements act to axially displace each of said pair of outer clutch plates and each of said pair of inner clutch plates.

2. The one-way clutch for an automotive component as recited in claim 1 wherein said at least one window is a plurality of windows aligned such that each of said plurality of windows rotationally engages one locking finger when said pairs of inner and outer clutch plates or said catch plate are moved in a locking direction.

3. The one-way clutch for an automotive component as recited in claim 1 wherein said at least one inner locking finger is a plurality of inner locking fingers and said at least one outer locking finger is a plurality of outer locking fingers.

4. The one-way clutch for an automotive component as recited in claim 1 wherein said locking fingers move over each of said at least one window when said pairs of inner and outer clutch plates rotate in a freewheeling direction.

5. The one-way clutch for an automotive component as recited in claim 1 wherein each of said at least one biasing elements contact said biasing surface.

6. The one-way clutch for an automotive component as recited in claim 1 wherein said automotive component is a stator for a torque converter.

7. A one-way clutch, comprising:
    an axis of rotation;
    a biasing surface;
    a catch plate including a first plurality of windows, the catch plate connected to an automotive component such that rotation of the catch plate is locked to rotation of the automotive component;
    an outer clutch plate:
        located between the catch plate and the biasing surface in an axial direction parallel to the axis of rotation; and,
        including a second plurality of windows, a first plurality of biasing elements, and a first plurality of locking fingers; and,
    an inner clutch plate:
        located between the catch plate and the outer clutch plate in the axial direction; and,
        including a third plurality of windows, a second plurality of biasing elements, and a second plurality of locking fingers in contact with the catch plate, wherein:
            the second plurality of biasing elements passes through the second plurality of windows to contact the biasing surface to urge the inner clutch plate toward the catch plate;
            the first plurality of locking fingers passes through the third plurality of windows to contact the catch plate;
            for a first amount of rotation of the catch plate about the axis of rotation in a first direction, the first plurality of locking fingers is arranged to displace into the first plurality of windows to lock rotation of the outer clutch plate to rotation of the catch plate; and,
            for a second amount of rotation of the catch plate about the axis of rotation in the first direction, the second plurality of locking fingers is arranged to displace into the first plurality of windows to lock rotation of the inner clutch plate to rotation of the catch plate.

8. A one-way clutch, comprising:
    an axis of rotation;

a biasing surface;
a catch plate including a first plurality of windows, the catch plate connected to an automotive component such that rotation of the catch plate is locked to rotation of the automotive component;
an outer clutch plate:
  located between the catch plate and the biasing surface in an axial direction parallel to the axis of rotation from the catch plate to the biasing surface; and,
  including a second plurality of windows, a first plurality of biasing elements aligned with the second plurality of windows in the axial direction, and a first plurality of locking fingers located outward of the first plurality of biasing elements in a radial direction orthogonal to the axis of rotation; and,
an inner clutch plate:
  located between the catch plate and the outer clutch plate in the first axial direction; and,
  including a third plurality of windows, a second plurality of biasing elements aligned with the third plurality of windows in the axial direction, and a second plurality of locking fingers in contact with the catch plate and located outward of the second plurality of biasing elements in the radial direction, wherein:
the first plurality of biasing elements contacts the biasing surface to urge the outer clutch plate toward the catch plate;
the second plurality of biasing elements passes through the second plurality of windows to contact the biasing surface to urge the inner clutch plate toward the catch plate;
the first plurality of locking fingers passes through the third plurality of windows to contact the catch plate;
for a first amount of rotation of the catch plate about the axis of rotation in a first direction, the first plurality of locking fingers is arranged to displace into the first plurality of windows to lock rotation of the outer clutch plate to rotation of the catch plate; and,
for a second amount of rotation of the catch plate about the axis of rotation in the first direction, the second plurality of locking fingers is arranged to displace into the first plurality of windows to lock rotation of the inner clutch plate to rotation of the catch plate.

\* \* \* \* \*